(12) United States Patent  (10) Patent No.: US 8,306,736 B2
Wu  (45) Date of Patent: Nov. 6, 2012

(54) METHOD AND APPARATUS FOR VARIABLE SPEED ROUTE SIMULATION OPERATION FOR NAVIGATION SYSTEM

(75) Inventor: Chun-Hsien Wu, Torrance, CA (US)

(73) Assignee: Alpine Electronics, Inc., Tokyo (JP)

( * ) Notice: Subject to any disclaimer, the term of this patent is extended or adjusted under 35 U.S.C. 154(b) by 1528 days.

(21) Appl. No.: 11/805,909

(22) Filed: May 25, 2007

(65) Prior Publication Data

US 2010/0094533 A1    Apr. 15, 2010

(51) Int. Cl.
G01C 21/00 (2006.01)
G01C 21/26 (2006.01)
G01C 21/34 (2006.01)
G08G 1/09 (2006.01)
G08G 1/123 (2006.01)
G06F 17/00 (2006.01)

(52) U.S. Cl. ........ 701/410; 701/432; 701/437; 701/455; 340/995.15; 340/995.2

(58) Field of Classification Search .............. 701/1, 200, 701/201, 207–209, 211, 400, 409, 410, 431, 701/538, 408, 421, 426, 428, 429, 432, 436, 701/437, 454, 455, 457, 532, 533, 300; 340/988–990, 995.1, 995.14, 995.15, 995.19, 340/995.2

See application file for complete search history.

(56) References Cited

U.S. PATENT DOCUMENTS

| | | | | |
|---|---|---|---|---|
| 5,748,109 | A * | 5/1998 | Kosaka et al. | 340/995.14 |
| 5,945,927 | A * | 8/1999 | Nakayama et al. | 340/995.14 |
| 6,038,507 | A * | 3/2000 | Miyano | 701/202 |
| 7,177,761 | B2 * | 2/2007 | Kaufman et al. | 701/211 |
| 7,769,540 | B2 * | 8/2010 | Pinkus et al. | 701/208 |
| 2006/0089798 | A1 * | 4/2006 | Kaufman et al. | 701/211 |
| 2008/0147317 | A1 * | 6/2008 | Ohn | 701/208 |

FOREIGN PATENT DOCUMENTS

| | | |
|---|---|---|
| JP | 09-079862 | 3/1997 |
| JP | 2001-147130 | 5/2001 |

* cited by examiner

*Primary Examiner* — Thomas Tarcza
*Assistant Examiner* — Edward Pipala
(74) *Attorney, Agent, or Firm* — Muramatsu & Associates

(57) ABSTRACT

A method for route simulation operation on a navigation system is able to complete the route simulation operation within a short period of time. The method includes the steps of: calculating a route from a starting point to a destination; determining a first route simulation speed for a preset number of first turns from the starting point; determining a second route simulation speed for a preset number of last turns before the destination; determining a third route simulation speed for a remaining part of the calculated route; and displaying a progression indicator on the calculated route to the destination on a map image on the screen of the navigation system and moving the progression indicator based on the simulation speeds determined in the above steps.

20 Claims, 8 Drawing Sheets

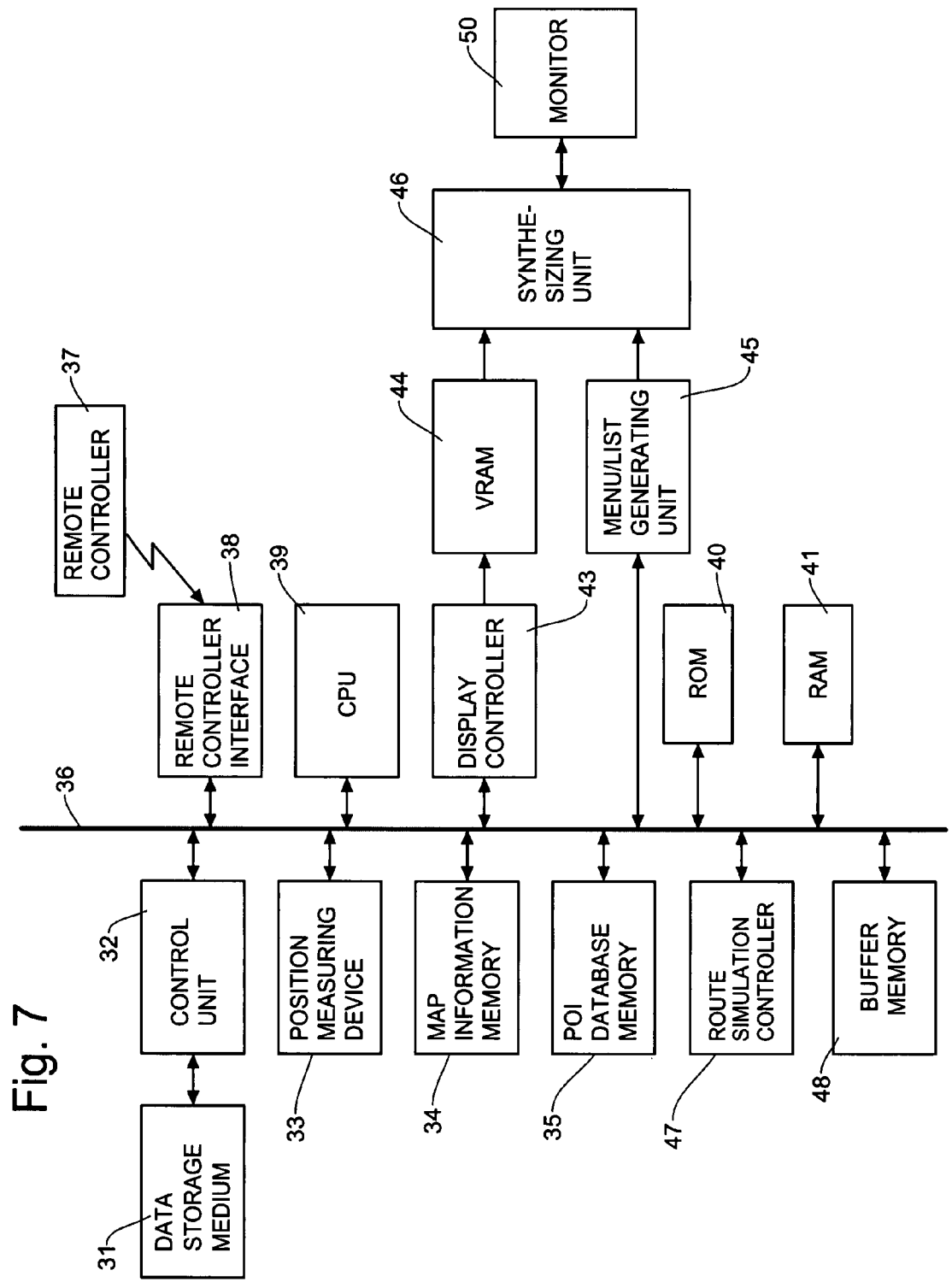

METHOD AND APPARATUS FOR VARIABLE SPEED ROUTE SIMULATION OPERATION FOR NAVIGATION SYSTEM

FIELD OF THE INVENTION

This invention relates to a method and apparatus for conducting a route simulation operation, and more particularly, to a method and apparatus for displaying a route simulation operation on a screen of a navigation system in which a progression indicator moves toward a destination on a calculated route and the simulation operation completes within a relatively short period of time while providing adequate information associated with the calculated route to the destination, thereby enabling the user to familiarize with the route before actually starting the trip to the destination.

BACKGROUND OF THE INVENTION

A navigation system performs travel guidance for enabling a user to easily and quickly arrive at the selected destination. A typical example is a vehicle navigation system where a vehicle is equipped with a navigation function to guide a user to a destination through a calculated route. Such a navigation system detects the position of the user's vehicle, and reads out map data pertaining to an area at the current vehicle position from a data storage medium, for example, a DVD (digital versatile disc) or a hard disc.

Typically, the navigation system displays a map image on a monitor screen while superimposing thereon a mark representing the current location of the user. When a destination is specified by the user, the navigation system calculates an appropriate route to the destination and starts a route guidance operation. At an intersection on the calculated route to the destination that requires a maneuvering action, the navigation system notifies the user which direction to turn.

Typically, recent navigation systems include a route simulation function to graphically display a simulated trip for reaching the destination through the calculated route. The purpose of the route simulation function is to allow the user preview the trip so that the user can become familiar with the basic route. The navigation system calculates a route from the starting point to the destination, and shows an image of travel along the calculated route on a monitor screen by moving a position indicator.

For example, on the map image on the monitor screen, the icon showing the vehicle position moves along the calculated route from the starting point to the destination. FIGS. 1A and 1B are schematic diagrams showing examples of image on the monitor screen of the navigation system when the route simulation is performed. In FIGS. 1A and 1B, a reference number 29 indicates the starting point, and a progression indicator 23 is a highlighted image on the calculated route which shows a simulated position of the vehicle. The head of the progression indicator 23 gradually moves toward the destination on the map image. Thus, the movement of the head of the progression indicator 23 illustrates the movement of the simulated vehicle during the route simulation operation.

FIG. 1A shows a case where a relatively short time has passed after the start of the route simulation operation. The progression indicator 23 moves on the calculated route in the direction as shown by the arrow with a constant speed. In FIG. 1B, the route simulation operation is further advanced toward the destination and the head of the progression indicator 23 is on a freeway 91. In the conventional route simulation operation, the simulation speed on the map image, i.e., the moving speed of the progression indicator 23, is constant regardless of the location on the route, the type of road on the route, or a scale factor of the map image.

Although the route simulation function is a useful feature, it can pose a problem when a distance of the route for the route simulation is very long. For example, in the case where a route from Los Angeles to New York is to be simulated on the navigation screen, it can take several hours to finish the route simulation operation. Thus, it is desired that the route simulation operation be completed within a relatively short period of time even when a distance between the starting point and the destination is very long while the route simulation can provide adequate information for the user to obtain a basic idea of the route before actually heading to the destination.

SUMMARY OF THE INVENTION

It is, therefore, an object of the present invention to provide a route simulation method and apparatus for a navigation system which is capable of completing the route simulation operation within a short period of time.

It is another object of the present invention to provide a route simulation method and apparatus for a navigation system which is capable of distinguishing the conditions of the route to the destination as to a high speed simulation mode and a low speed simulation mode.

It is a further object of the present invention to provide a method and apparatus of variable speed route simulation for a navigation system in which the speed of advancing a progression indicator is changed depending on locations on the route to the destination.

It is a further object of the present invention to provide a method and apparatus of variable speed route simulation for a navigation system in which the speed of advancing a progression indicator is changed depending on types of the road on the route to the destination.

It is a further object of the present invention to provide a method and apparatus of accelerated route simulation for a navigation system in which the speed of advancing a progression indicator is accelerated when the map scale is greater than a predetermined value.

One aspect of the present invention is a route simulation method for a navigation system which is capable of adapting appropriate simulation speeds depending on types of road and scales of map image. The method is comprised of the steps of: calculating a route from a starting point to a destination; determining a first route simulation speed for a first part of the calculated route having a preset number of first turns from the starting point; determining a second route simulation speed for a second part of the calculated route having a preset number of last turns before the destination; determining a third route simulation speed for a remaining part of the calculated route where the third route simulation speed is higher than the first or second route simulation speed; and displaying a progression indicator on the calculated route to the destination on a map image on the screen of the navigation system and moving the progression indicator based on the simulation speeds determined in the above steps.

In the method of the route simulation operation, the step of displaying and moving the progression indicator on the map image includes a step of adjusting a scale factor of the map image in such a way that the scale factor increases when the route simulation speed is high and the scale factor decreases when the route simulation speed is low.

The method of the route simulation operation further includes a step of determining a total distance between the starting point and the destination for allocating route simulation speeds to locations on the calculated route. The method further includes a step of presetting an overall route simulation time regardless of a total distance between the starting point and the destination.

The method of conducting the route simulation operation further includes steps of: presetting an overall route simulation time; determining a total distance between the starting point and the destination; and allocating route simulation speeds to locations on the calculated route by reflecting the total distance and adjusting the first, second, and third route simulation speeds so that the route simulation operation will complete within the preset overall route simulation time.

In the method of the present invention, the step of determining the third route simulation speed includes a step of determining a type of road on the calculated route and a step of adjusting the third route simulation speed depending on the type of road. Further, in the method of the present invention, the step of determining the third route simulation speed includes a step of detecting maneuver points on the calculated route, a step of categorizing the maneuver points based on complexity of maneuvering action, and a step of decreasing the route simulation speed depending on the category of the maneuver points, where the maneuvering action includes turn, U-turn, and stop.

In the method of conducting a route simulation operation, the first route simulation speed for the first part of the calculated route is lower than the second route simulation speed for the second part of the calculated route. Further, in the method of the present invention, the first route simulation speed for the first part of the calculated route or the second route simulation speed for the second part of the calculated route is further adjusted based on whether the first part or second part is congested or not.

Another aspect of the present invention is an apparatus for conducting a route simulation operation for a navigation system which is capable of adapting appropriate simulation speeds depending on types of road, particular locations on the calculated route, and scales of map image. The route simulation apparatus is configured to implement the various operations steps defined in the simulation method noted above. Thus, the navigation system incorporating this simulation apparatus is able to conduct the route simulation operation on the screen within a short time.

According to the present invention, the navigation system utilizes the route simulation method which is capable of completing the route simulation operation within a short period of time even when a distance to the destination is long. The navigation system is able to distinguish the conditions associated with the route to the destination corresponding to the high speed simulation mode and the low speed simulation mode. Thus, the speed of advancing the progression indicator is changed during the route simulation operation depending on the location on the route. Further, the speed of advancing the progression indicator is changed during the route simulation operation depending on the type or level of roads. Furthermore, the speed of advancing the progression indicator is changed during the route simulation operation depending on the degree of the map scale. Because of the variable route simulation speeds, the overall route simulation operation can be completed quickly while providing sufficient information to the user.

BRIEF DESCRIPTION OF THE DRAWINGS

FIG. 2A shows a case where the map scale is small, FIG. 2B shows a case where the map scale is large, FIG. 2C shows a case where the route simulation is conducted at an area close to the destination, and FIG. 2D shows a case where the simulation speed is accelerated on the freeway.

FIG. 7 is a functional block diagram showing a basic structure of a vehicle navigation system or an electronic device having a navigation function which incorporating the route simulation method of the present invention.

DETAILED DESCRIPTION OF THE PREFERRED EMBODIMENT

The navigation system of the present invention will be described in more detail with reference to the accompanying drawings. The present invention is designed to provide a route simulation function in which a route simulation operation can be finished within a short period of time by adapting variable simulation speeds based on various conditions such as types of the road, scale factor of the map image, and locations on the route, etc. Although the description will be made for a vehicle navigation system for an illustration purpose, it should be noted that the route simulation function of the present invention is applicable to other types of navigation system such as a portable or hand-held device, a personal computer, a cellular phone, etc., so long as it has a navigation function.

FIGS. 2A-2D are schematic diagrams showing examples of images on the navigation screen when the route simulation is conducted which includes a variable-speed progression indicator in accordance with the present invention. In FIGS. 2A-2D, the navigation screen 21 shows a map image, a scale indicator 19, and a progression indicator 23. The head of the progression indicator 23 moves along the calculated route toward the destination for the route simulation operation. The words "slow", "middle" and "high" indicate the simulation speed, i.e., the moving speed of the head of the progression indicator 23.

Figure 1A:
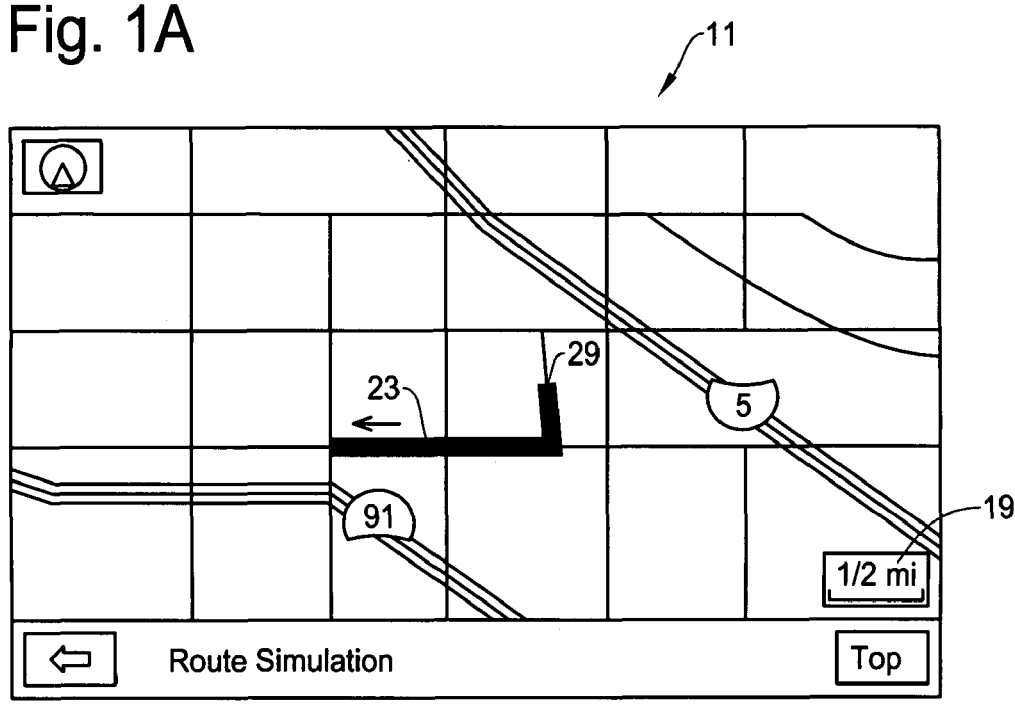
FIGS. 1A and 1B are schematic diagrams showing examples of image on the navigation screen when the route simulation is conducted after a route to the destination is calculated according to the conventional technology.
Figure 1B:
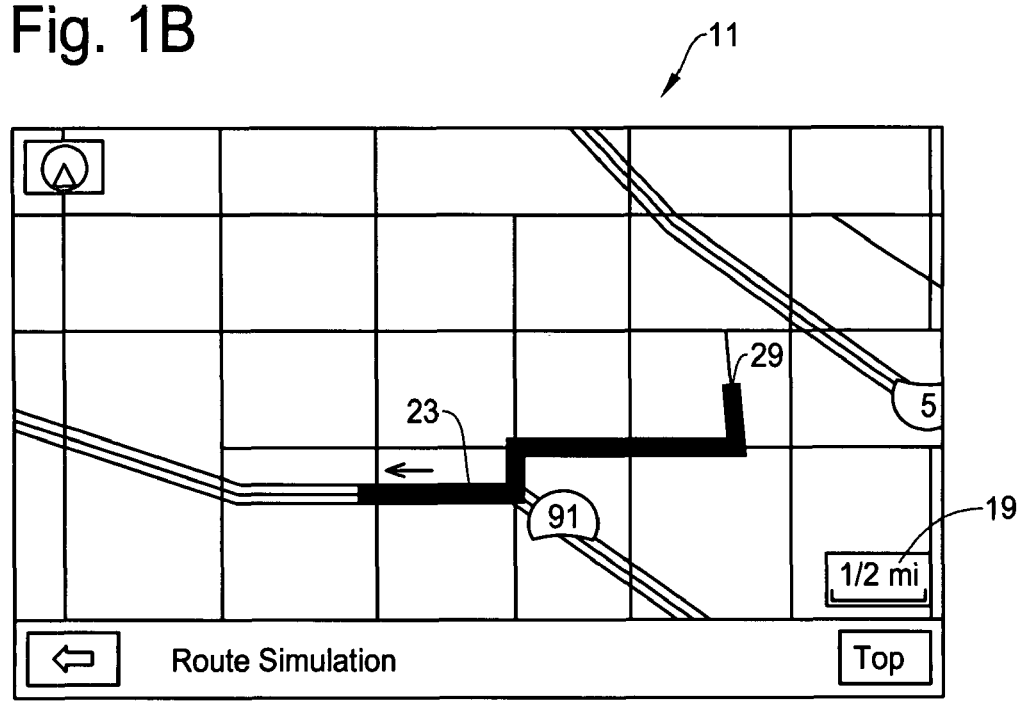
Figure 2A:
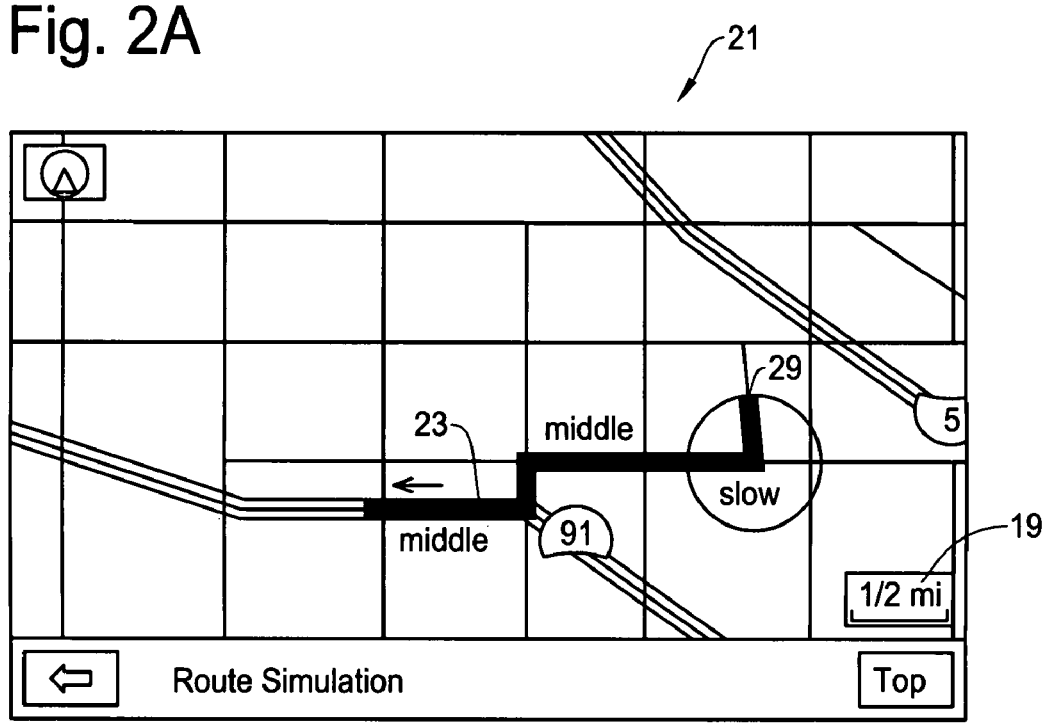
FIGS. 2A-2D are schematic diagrams showing examples of images on the navigation screen when the route simulation is conducted in accordance with the present invention which includes a variable-speed progression indicator, where

The example of FIG. 2A shows a case where the route simulation is performed on the map image with a relatively small map scale, i.e., zoomed-in. The scale indicator 19 shows the relationship between a unit distance on the map image and an actual distance on the map image, i.e., a map scale or scale factor which is ½ mile per unit. When the route simulation operation starts, the progression indicator 23 moves from the starting point 29 to the destination on the calculated route in the direction as shown by the arrow to show the simulated location of the vehicle.

The starting point 29 is typically a current position of the user, i.e., a vehicle, or alternatively, any desired location specified by the user. FIG. 2A includes a circle at the area close to the starting point 29 where the navigation system operates in a slow speed simulation mode. Namely, this circle on the map image means that the route simulation speed is decreased in the area illustrated by the circle which is close to the starting point 29.

In one example, such a slow speed simulation is conducted for the first predetermined number of turns from the starting point 29. This is because, in many cases, the user has to make several turns until reaching a major road, thus, it is important to become familiar with first several turns. Thus, for example, in the present invention, the route simulation speed by advancing the progression indicator 23 on the map image is set to be slow for the first three turns. The speed of advancing the progression indicator 23 in the slow speed simulation mode is set, for example, to an anticipated actual driving speed of the vehicle such as 25 miles/hr.

Figure 2B:
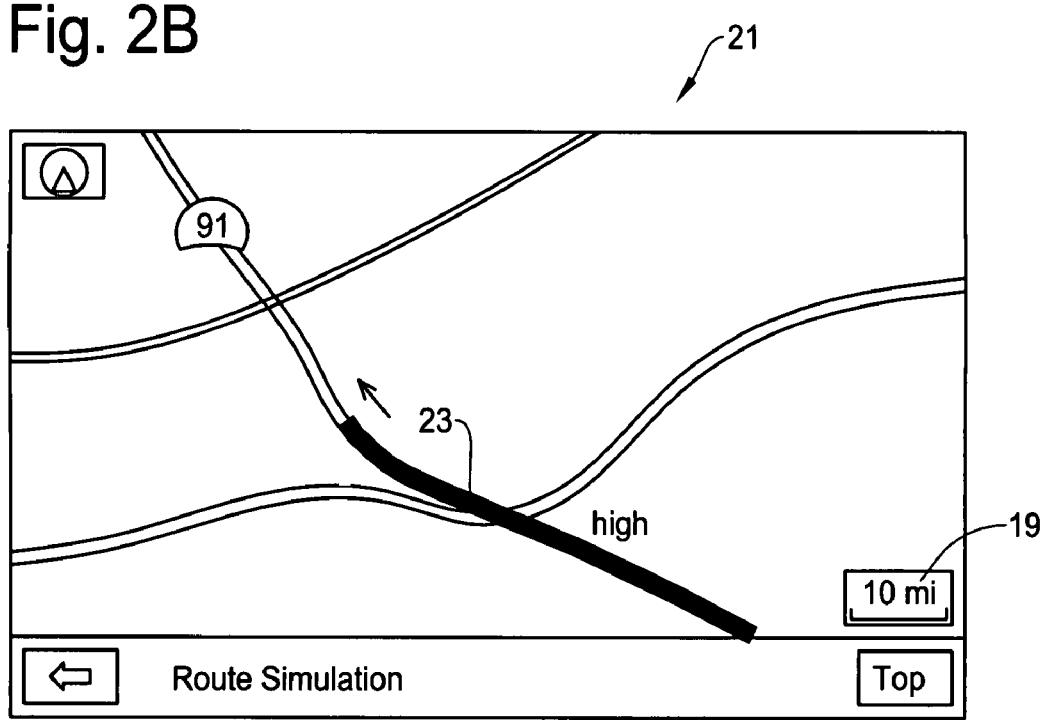

After the first three turns in the location designated by the circle of FIG. 2A, the speed of advancing the progression indicator 23 is increased as indicated by "middle" where the navigation system is in the middle speed simulation mode. In order to accommodate the higher simulation speed, the map image on the navigation screen 21 may be zoomed out, i.e, the map scale is increased, to cover a wider area as shown in FIG. 2B. In the example of FIG. 2B, the map scale is "10 miles" per distance unit, thus, the navigation screen 21 covers an area wider than that of FIG. 2A.

In such a situation, only major roads such as freeways and toll roads are displayed while small or lower level roads are no longer illustrated. Because the map image is simplified by not showing many small roads and icons, the burden for processing the map data is relieved from the processor so that more processing power of the navigation system can be used for the route simulation. Thus, the speed of advancing the progression indicator 23 can be accelerated as indicated by "high" which indicates that the navigation system is in the high speed simulation mode.

Figure 2C:
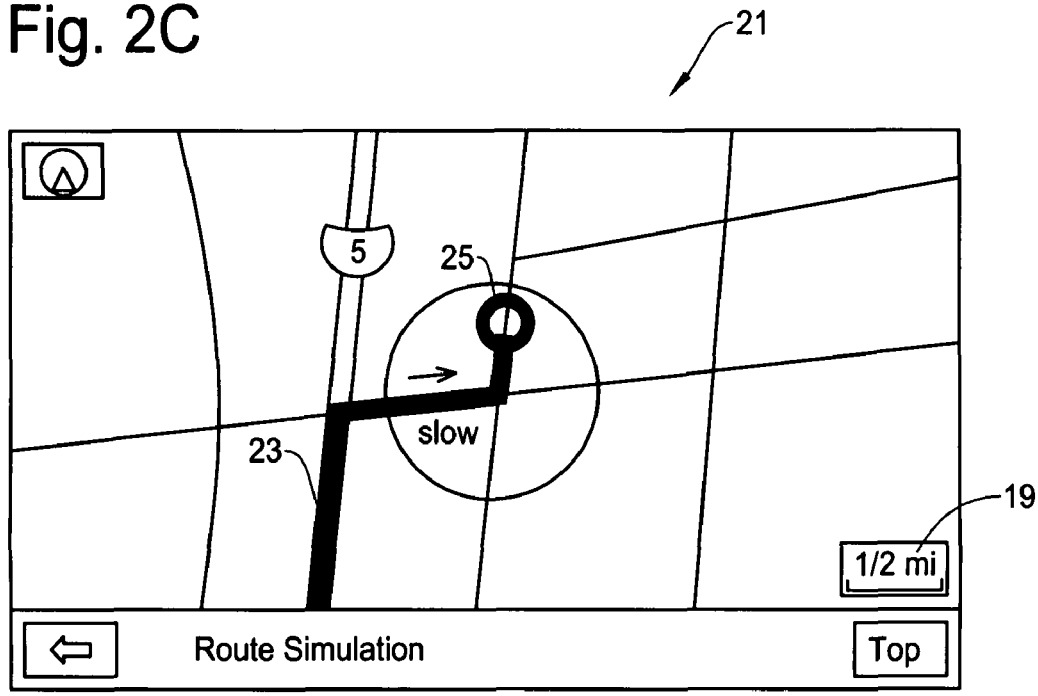

Similar to the area close to the starting point noted above, the route simulation speed is preferably slowed down at an area close to the destination. FIG. 2C shows such a situation which includes a destination indicator 25 and the progression indicator 23. For example, the speed of advancing the route progression indicator 23 is slowed down in the area indicated by the circle which corresponds to the last three turns. The speed of advancing the progression indicator 23 may be set to an anticipated actual vehicle speed, such as 35 miles/hr. The map image may be automatically zoomed-in, i.e., the map scale is decreased, to show enlarged map image close to the destination.

Figure 2D:
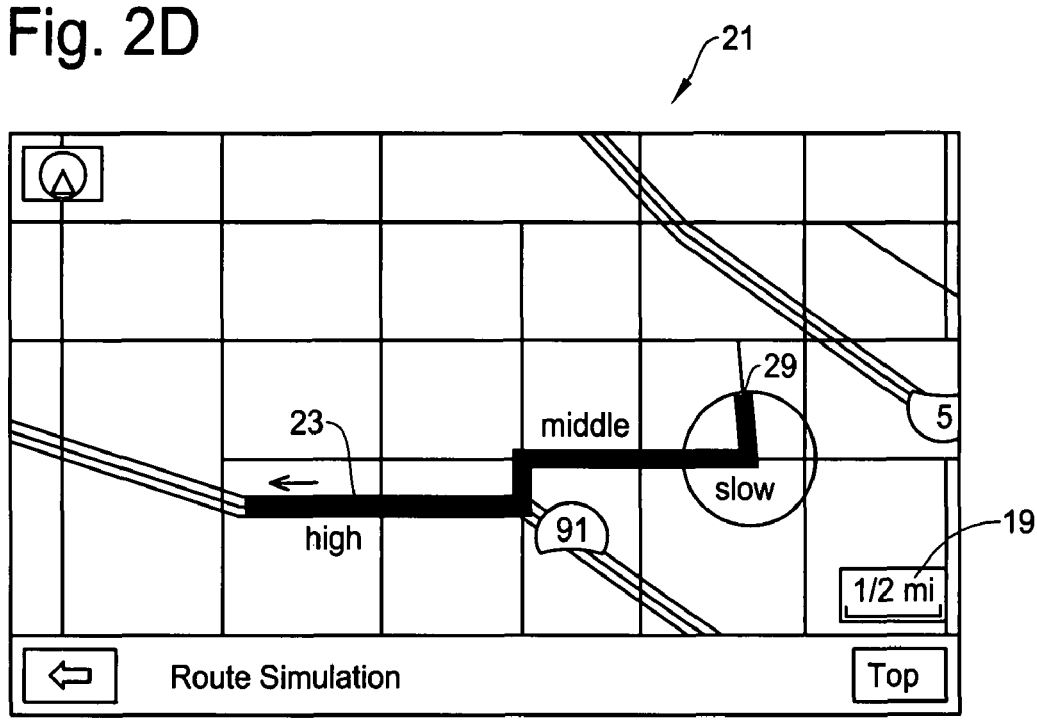

FIG. 2D shows a navigation screen similar to that of FIG. 2A except that the speed of advancing the progression indicator 23 is changed depending on the type of road. More specifically, in the example of FIG. 2D, the speed of advancing the progression indicator 23 is increased on the freeway as indicated by "high" which indicates that the navigation system is in the high speed simulation mode. Because once the vehicle is on a freeway or highway, the user drives the vehicle on the freeway for a relatively long distance without leaving the freeway, it is preferable to increase the simulation speed. However, since the map scale is small, the processor of the navigation system has to have a high computation power to achieve the high speed route simulation while displaying the detailed map image including many lower level roads.

As described above, in the route simulation method of the present invention, the simulation speed, i.e, the speed of advancing the progression indicator 23 is varied depending on the various factors. For example, the simulation speed during the first three turns and the last three turns is set to be low, while the speed at the rest of the route is set to be fast. Further, the speed of advancing the progression indicator 23 is changed depending on the type or level of roads on the calculated route and the degree of the map scale of the map image.

In the present invention, an overall time required for the route simulation operation may be set to a predetermined time. In such a case, the route simulation operation will finish within the predetermined time without regard to the distance between the starting point and the destination. For example, in the case where the route simulation time is set to five (5) minutes, the navigation system will calculate to finish the route simulation operation within five (5) minutes by adjusting and allocating the variable simulation speeds noted above.

Figure 3:
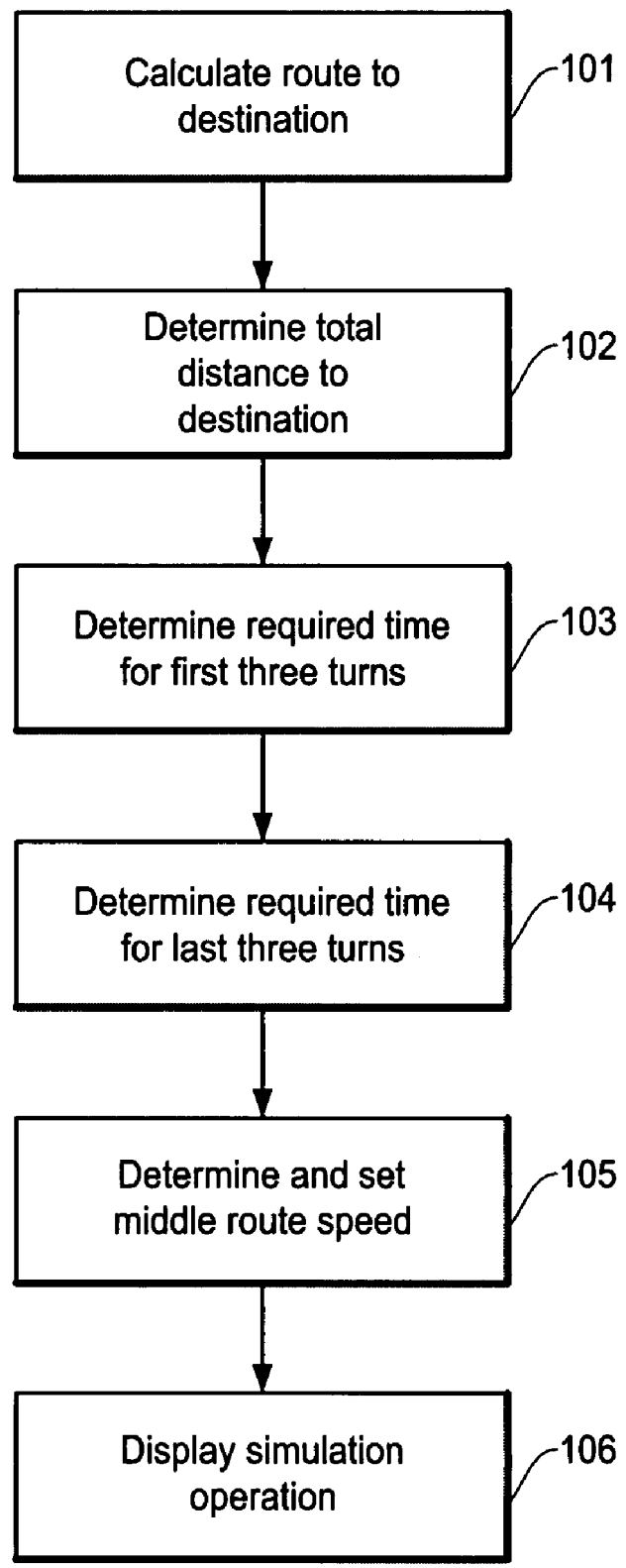
FIG. 3 is a flow chart showing the steps of determining as to which route fits to a high speed simulation mode and which route fits to a low speed simulation mode under the present invention based on locations on the route to the destination.

FIG. 3 is a flow chart showing the basic steps of setting the speed for the route simulation operation as described above in the present invention. In the first step 101, the navigation system will calculate an appropriate route based on the user's setting of the starting point and the destination. Next, the navigation system will determine the total distance of the calculated route between the starting point and the destination in the step 102 for allocating route simulation speeds to locations on the calculated route.

In the case where the overall simulation time is predetermined as noted above, the navigation system assigns the simulation speed to the locations on the route based on the total distance and various other conditions to finish the route simulation within the predetermined time. For example, in the case where the overall simulation time is predetermined to five (5) minutes as in the above example, and the simulation times for the first three turns and the last three turns are one minute, respectively, the simulation time form the remaining route is three minutes without regard to the distance.

In the step 103, the simulation time required for the first three turns from the staring point will be determined by taking the actual driving condition into account. For example, if the overall distance for the first three turns is 0.5 mile and the anticipated driving speed is 25 miles/hr, the required simulation time for the first three turns is one minute and twelve seconds. Similarly, in the step 104, the time required for the route simulation for the last three turns will be determined. If the total distance for the last three turns is 0.5 miles and the anticipated driving speed is 35 miles/hr, the required simulation time for the first three turns is about 53 seconds.

In the step 105, the amount of time that can be used for route simulation of the rest of the route (middle route) is determined. In the case where the predetermined overall time for the route simulation operation is five (5) minutes, and the first three turns and the last three turns require 1 minutes 12 seconds and 53 seconds, respectively, as noted above, the simulation time allotted to the middle route will be 2 minutes 55 seconds. Based on the assigned simulation speeds, the navigation then displays the route simulation operation on the screen by advancing the progression indicator 23 along the route to the destination such as shown in FIGS. 2A-2D in the step 106.

In the description above, the first three turns and the last three turns are assigned with the lower simulation speed by moving the progression indicator at a lower speed to allow the user to confirm the route. It is apparent that the numbers of the first turns and last turns are not limited to three but may take any other numbers as well. For instance, a lower simulation speed may be assigned to the first five (5) turns from the staring point and to the last four (4) turns to the destination.

Moreover, the simulation speed for the first and last three turns may also vary depending on the surrounding situation, for example, whether the starting point or destination is in a congested area or not. When the starting point or destination is in a congested area such as a downtown, the anticipated driving speed or moving speed of the progression indicator 23 is lower such as 15-25 miles/hr. When the starting point or destination is in a local area, the anticipated driving speed or moving speed of the progression indicator 23 may be 35-45 miles/hr. The simulation speed may be changed by reflecting such anticipated driving speed.

In this embodiment, the total time for the route simulation operation is preset to be five minutes, but any other time may be used as well, such as three minutes, seven minutes, etc. The simulation time for the middle route is determined by subtracting the required times for the first three turns and the last three turns from the preset total simulation time. As described with reference to FIG. 2C, the simulation time for the middle route may be changed depending on the type or class of road.

In another example, the route simulation time for the middle route may have a prescribed time independent from the first and last three turns and total time. For instance, the navigation system may simply allot three minutes for the middle route regardless of the simulation times for the first and last three turns. Supposing that the simulation time for the first three turns is 1 minutes 12 seconds and the last three turns is 53 seconds as in the above example, and the navigation system simply allocates three minutes for the middle route, the total time of the route simulation operation will be 5 minutes 5 seconds.

When the simulation time for the middle route segment is predetermined, there may arise a case where the route simulation speed for the middle route segment becomes excessively slow when the distance thereof is short. In order to avoid such a situation, a minimum speed may be established such that the progression speed will not fall below the minimum speed. For example, when the minimum speed for the middle route is set to be 40 miles/hr and the calculated speed for the middle route is 30 miles/hr, the navigation system employs the speed of 40 miles/hr for advancing the progression indicator 23.

Figure 4:
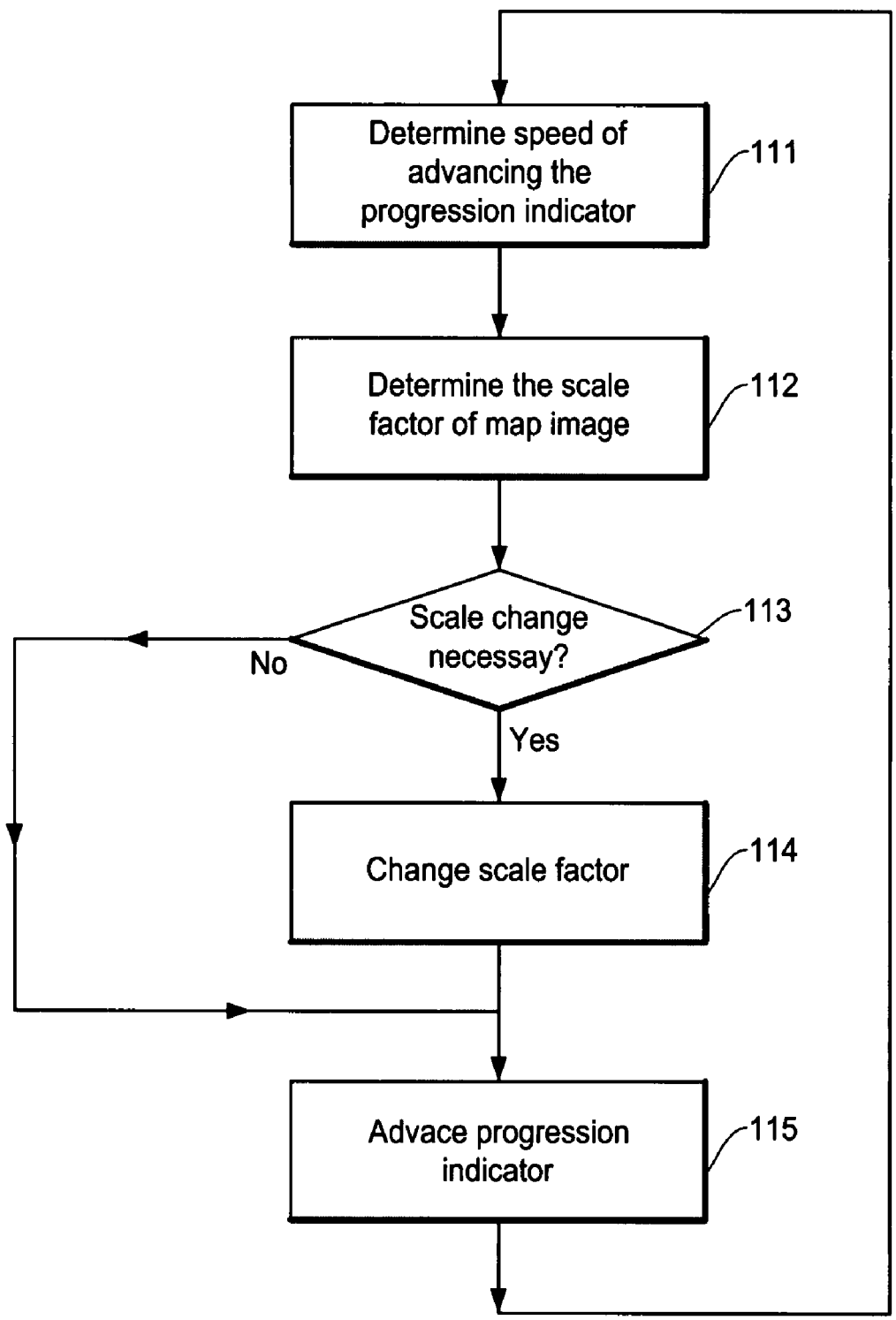
FIG. 4 is a flow chart showing the steps of changing the map scale by zooming-in and zooming-out of the map image during the route simulation operation so that the route simulation speed changes depending on the map scale.

The basic steps of displaying the route simulation operation is described with reference to the flow chart of FIG. 4. As noted above, the route simulation operation of the present invention incorporates different simulation speeds depending on the map scale, locations on the routes, types of road, etc. After calculating the route to the destination, the navigation system allocates different simulation speeds to different locations or ranges on the route and starts route simulation operation as described above with reference to FIG. 3.

Based on the allocated simulation speeds, the navigation system displays the route simulation operation by moving the progression indicator 23 on the map screen in the step 111. For example, in the method shown in FIGS. 2A-2D, for the location including the first three turns from the starting point, a slower simulation speed is assigned. Next, in the step 112, the navigation system determines the scale factor of the map image that is appropriate to the assigned route simulation speed.

In the example shown in FIGS. 2A and 2D, the scale factor is ½ mile per distance unit as shown by the scale indicator 19. Then, based on the map scale (scale factor) of the current screen, the navigation will determine whether it is necessary to change the map scale in the step 113. That is, the navigation system will determine whether the navigation system is able to display the map image and the movement of the progression indicator 23 in an efficient and smooth manner.

If the moving speed of the progression indicator 23 is high and the scale factor of the map image is small, the navigation system has to constantly change the map image to the next screens. Since each map image includes detailed map elements because the scale factor is small (zoomed in), it is necessary that the navigation needs a high computation power of the processor. In such a case, it is preferable that the navigation system increases the map scale (zoom out) to cover a wider area while omitting the detailed map elements such as low level streets and icons.

Conversely, if the moving speed of the progression indicator 23 is slow and the scale factor of the map image is large (zoomed out), the progression indicator 23 advances too slow on the route simulation screen. Thus, in such a situation, the navigation system decreases the scale factor (zoom in) to show narrower area or increases the moving speed of the progression indicator 23. Thus, depending on the speed of advancing the progression indicator 23 and the current map scale or scale factor, the route simulation speed and the map scale are changed to achieve an efficient and smooth route simulation operation.

If the navigation system determines that a change in the map scale is necessary, it will change the scale factor of the map image and redraw the map image in the step 114. Then, the route simulation operation is conducted by advancing the progression indicator 23 on the map image redrawn by the different map scale in the step 115. In the case where the navigation system determines that a change in the map scale is not necessary, the navigation system skips the step 114 and proceeds to displaying the route simulation operation. The above procedure is repeated through the route simulation operation to display the efficient and smooth operation on the monitor screen.

Figure 5:
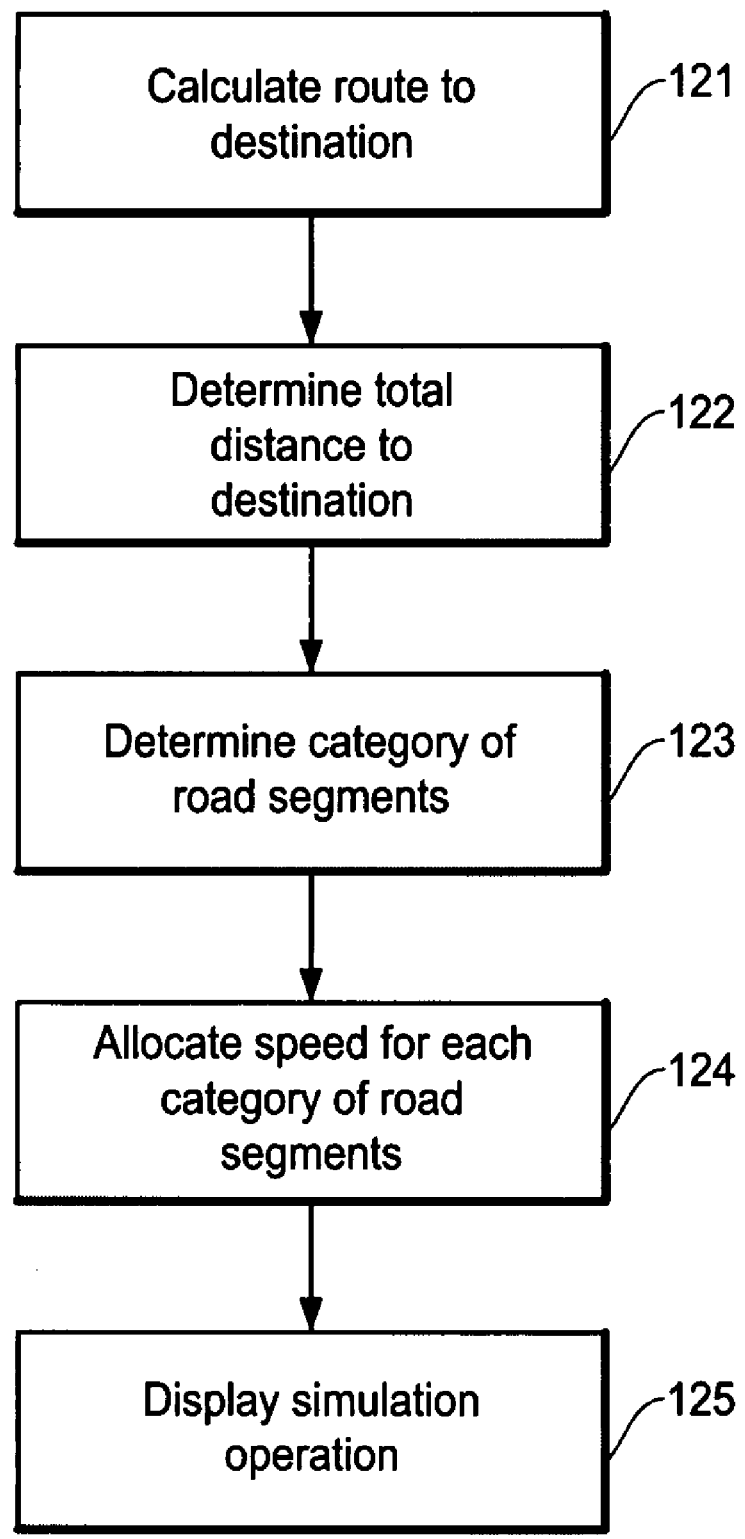
FIG. 5 is a flow chart showing the steps of determining as to which route fits to the high speed simulation mode and which route fits to the low speed simulation mode under the present invention based on the types of roads on the route to the destination.

FIG. 5 is a flow chart showing another example of route simulation operation under the present invention where the route simulation speed, i.e., the speed of advancing the progression indicator 23 is adjusted based on the road type or class. Through the map database, the navigation system is able to easily obtain the information on road types and classes, such as residential streets, major streets, toll roads, freeways, etc. As described with reference to FIG. 2D above, the navigation system varies the route simulation speed depending on the types or classes of the road segments on the calculated route to the destination.

In FIG. 5, in the step 121, the navigation system calculates the route based on the user's setting of the starting point and the destination similar to the case shown in the flow chart of FIG. 3. Next, the navigation system determines an overall distance of the calculated route connecting the starting point and the destination in the step 122, which is used for calculating simulation speeds. Further, the road types (class or category) of the road segments on the calculated route are examined in the step 123 based on the map data.

For simplicity, the road segments are classified into, for example, two categories, a high speed road and a slow speed road. Freeways, highways and toll roads are classified into the high speed road category, while other road segments such as residential streets, streets in commercial area, etc., are classified into the slow speed road. Then, in the step 124, the navigation system allocates the route simulation speed to the categories or type of the road segments on the calculated route.

For instance, the navigation system may set the route simulation speed which is equivalent to 300 miles/hr for the high speed road category and 150 miles/hr for the slow speed road category. Because the route simulation operation must be completed within a relatively short time, such as several minutes, the allocated speed in the above example is much faster than an actual driving speed. Thus, when the navigation system starts the route simulation operation in the step 125, the simulation speed will change depending on the type of road on the map image.

In the case where the overall route simulation time is predetermined, the simulation speeds for the high speed road category and the low speed road category may be adjusted so that the route simulation operation will be completed within the prescribed time. For example, it is assumed the situation in which the predetermined simulation time is five (5) minutes, the distance from the starting point to the destination is 20 miles from which the high speed road category is 12 miles and the slow speed road category is 8 miles. Then, the simulation speed or time for each road category can be determined, i.e., about two minutes and 9 seconds for the high speed road category with the speed of 336 miles/hr, and two minutes and 51 seconds for the slow speed road category with the speed of 168 miles/hr.

Although the simulation speeds allocated in the above example are expressed by the actual values or numbers, it is also feasible to allocate the simulation speed to each road type by a speed ratio rather than the actual values. For example, the speed ratio between the high speed road category and the low speed road category may be set to 2:1. Based on this speed ratio and the other factors such as the first three and last three turns, total distance, and the prescribed overall simulation time, actual simulation speeds of the high speed road category and the low speed road category will be determined.

Figure 6:
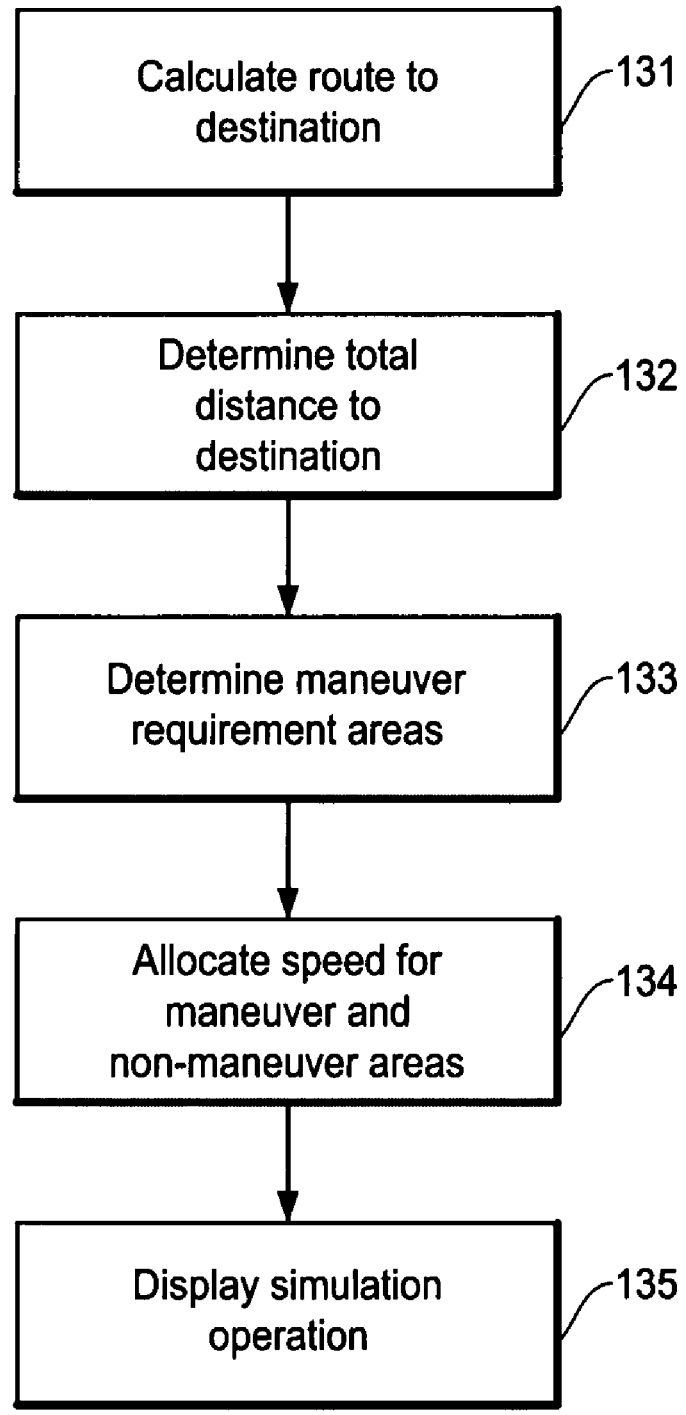
FIG. 6 is a flow chart showing the steps of determining the route simulation speed based on maneuvering action at each intersection on the route to the destination in accordance with the present invention.

FIG. 6 is a flow chart showing another example of route simulation operation under the present invention where the route simulation speed, i.e., the speed of advancing the progression indicator 23 is adjusted based on the needs of traffic maneuvering. Namely, the route simulation speed is decreased at an area where traffic maneuvering is needed on the calculated route to the destination. Here, the traffic maneuvering includes such maneuvering actions as making a turn, U-turn, stop, etc.

In the flow chart of FIG. 6, at the step 131, the navigation system calculates the route between the starting point and the destination similar to the above examples. Next, the navigation system will determine the total distance of the calculated route connecting the starting point and the destination in the step 132, which is used for calculating simulation speeds. Then, the navigation system examines information on the traffic maneuvering on the calculated route in the step 133.

The information on the traffic maneuvering includes types of maneuvering such as right turn, left turn, U-turn, stop, etc., locations of maneuvering (latitude, longitude), and types of area (surrounding situation) associated with the maneuvering such as downtown area or local area. With use of such information, the traffic maneuvering may be classified into a plurality of categories based on, for example, complexity associated with the maneuvering action, i.e., simple, average, complex, etc. In the step 134, based on such information, the navigation system determines the route simulation speed at the location associated with the traffic maneuvering.

For instance, the navigation system may set 0.2 miles before and after the maneuvering point as the maneuver associated area. The other areas are considered as non-maneuver associated areas. A slower route simulation speed is assigned to the maneuver associated area while a normal or higher speed is assigned to the non-maneuver associated areas. In the case where a plurality of categories for maneuver area has been established, the speed for advancing the progression indicator 23 may be controlled based on the complexity of maneuvering, for example, whether such maneuvering exists in a congested area or local area, or a particular structure of the intersection.

Thus, the route simulation operation is able to show the progression indicator 23 in a slower speed for the area requiring more attention while speeding up the rest of the areas to shorten the required time of the route simulation operation. Based on the allocated route simulation speeds, the navigation system will display the route simulation operation in the step 135 by moving the progression indicator 23 along the calculated route. The steps of changing the route simulation speed at first several turns and last several turns described with reference to FIG. 3, the steps of changing the scale factor described with reference to FIG. 4 and the steps of changing the route simulation speed based on the type of road described with reference to FIG. 5 can also be used in the method described with reference to FIG. 6.

FIG. 7 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the navigation system includes a data storage medium 31 such as a hard disc, CD-ROM, DVD or other storage means for storing the map data. The navigation system includes a control unit 32 for controlling an operation for reading the information from the data storage medium 31, and a position measuring device 33 for measuring the present vehicle position or user position. For example, the position measuring device 33 has a vehicle speed sensor for detecting a moving distance, a gyroscope for detecting a moving direction, a microprocessor for calculating a position, a GPS (global positioning system) receiver for receiving GPS signals from artificial satellites, and etc.

The block diagram of FIG. 7 further includes a map information memory 34 for storing the map information which is read from the data storage medium 31, a database memory for storing database information such as point of interest (POI) information which is read out from the data storage medium 31, a remote controller 37 for executing a menu selection operation, an enlarge/reduce operation, a destination input operation, etc. and a remote controller interface 38. Although a remote controller is a typical example for selecting menus, executing selected functions and etc., the navigation system includes various other input methods to achieve the same and similar operations done through the remote controller.

In FIG. 7, the navigation system further includes a bus 36 for interfacing the above units in the system, a processor (CPU) 39 for controlling an overall operation of the navigation system, a ROM 40 for storing various control programs such as a route search program and a map matching program necessary for navigation control, a RAM 41 for storing a processing result such as a guide route, a display controller 43 for generating map image (a map guide image and an arrow guide image) on the basis of the map information, a VRAM 44 for storing images generated by the display controller 43, a menu/list generating unit 45 for generating menu image/ various list images, a synthesizing unit 46, a route simulation controller 47 for controlling an overall operation of the route simulation of the present invention described above, a buffer memory 48 for temporally storing data for ease of data processing, and a monitor (display) 50.

In the configuration described above, the route simulation controller 47 can be a part of the CPU 39 or a separate processor to perform the route simulation operation of the present invention described above. The route simulation controller 47 determines the simulation speeds based on the locations, road types, predetermined total simulation time, etc. The route simulation controller 47 instructs the display controller 43 to change the map scale if necessary to show the route simulation operation in a smooth and efficient manner.

As has been described above, according to the present invention, the navigation system utilizes the route simulation method which is capable of completing the route simulation operation within a short period of time even when a distance to the destination is very long. The navigation system is able to distinguish the routes corresponding to the high speed simulation mode and to the low speed simulation mode. Thus, the speed of advancing the route progression indicator is changed during the route simulation operation depending on the location on the route. Further, the speed of advancing the route progression indicator is changed during the route simulation operation depending on the type or level of roads. Furthermore, the speed of advancing the route progression indicator is changed during the route simulation operation depending on the degree of the map scale. Because of such variable route simulation speeds, the overall route simulation operation can be completed quickly while providing sufficient information to the user.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A method of conducting a route simulation operation on a screen of a navigation system, comprising the following steps of:
   calculating a route from a starting point to a destination specified by a user;
   determining a first route simulation speed for a first part of the calculated route having a preset number of first turns from the starting point, the first route simulation speed being slow enough for the user to familiarize with the preset number of first turns;
   determining a second route simulation speed for a second part of the calculated route having a preset number of last turns before the destination, the second route simulation speed being slow enough for the user to familiarize with the preset number of last turns;
   determining a third route simulation speed for a part that extends between said first part and said second part of the calculated route, the third route simulation speed being higher than the first or second route simulation speed; and
   displaying a progression indicator on the calculated route to the destination on a map image on the screen of the navigation system and moving the progression indicator based on the simulation speeds determined in the above steps.

2. A method of conducting a route simulation operation as defined in claim 1, wherein said step of displaying and moving the progression indidator on the map image includes a step of adjusting a scale factor of the map image in such a way that the scale factor increases when the route simulation speed is high and the scale factor decreases when the route simulation speed is low.

3. A method of conducting a route simulation operation as defined in claim 1, further comprising a step of determining a total distance between the starting point and the destination for allocating route simulation speeds to locations on the calculated route.

4. A method of conducting a route simulation operation as defined in claim 1, further comprising a step of presetting an overall route simulation time regardless of a total distance between the starting point and the destination.

5. A method of conducting a route simulation operation as defined in claim 1, further comprising steps of:
   presetting an overall route simulation time;
   determining a total distance between the starting point and the destination; and
   allocating route simulation speeds to locations on the calculated route by reflecting the total distance and adjusting the first, second, and third route simulation speeds so that the route simulation operation will complete within the preset overall route simulation time.

6. A method of conducting a route simulation operation as defined in claim 1, wherein said step of determining the third route simulation speed includes a step of determining a type of road on the calculated route and a step of adjusting the third route simulation speed depending on the type of road.

7. A method of conducting a route simulation operation as defined in claim 1, wherein said step of determining the third route simulation speed includes a step of detecting maneuver points on the calculated route, a step of categorizing the maneuver points based on complexity of maneuvering action, and a step of decreasing the route simulation speed depending on the category of the maneuver points, where the maneuvering action includes turn, U-turn, and stop.

8. A method of conducting a route simulation operation as defined in claim 1, wherein the first route simulation speed for the first part of the calculated route is lower than the second route simulation speed for the second part of the calculated route.

9. A method of conducting a route simulation operation as defined in claim 1, wherein the first route simulation speed for the first part of the calculated route or the second route simulation speed for the second part of the calculated route is further adjusted based on whether the first part or second part is congested or not.

10. A method of conducting a route simulation operation as defined in claim 1, wherein said preset number of first turns from the starting point is three and said preset number of last turns before the destination is three.

11. An apparatus for conducting a route simulation operation on a screen of a navigation system, comprising:
   an input device for a user to specify a destination in the navigation system to calculate a route from a starting point to the destination;
   a route simulation controller for determining a first route simulation speed for a first part of the calculated route having a preset number of first turns from the starting point, the first route simulation speed being slow enough for the user to familiarize with the preset number of first turns;
   the route simulation controller determines a second route simulation speed for a second part of the calculated route having a preset number of last turns before the destination, the second route simulation speed being slow enough for the user to familiarize with the preset number of last turns;
   the route simulation controller determines a third route simulation speed for a part that extends between said first part and said second part of the calculated route, the third route simulation speed being higher than the first or second route simulation speed; and a display controller for controlling an operation of the screen based on the instruction from the route simulation controller for displaying a progression indicator on the calculated route to the destination on a map image on the screen of the navigation system and moving the progression indicator based on the simulation speeds determined by the route simulation controller.

12. An apparatus for conducting a route simulation operation as defined in claim 11, wherein said display controller for displaying and moving the progression indicator on the map image further controls the screen to display an adjusted scale factor of the map image in such a way that the scale factor increases when the route simulation speed is high and the scale factor decreases when the route simulation speed is low.

13. An apparatus for conducting a route simulation operation as defined in claim 11, wherein the route simulation controller determines a total distance between the starting point and the destination for allocating route simulation speeds to locations on the calculated route.

14. An apparatus for conducting a route simulation operation as defined in claim 11, wherein the route simulation controller presets an overall route simulation time regardless of a total distance between the starting point and the destination.

15. An apparatus for conducting a route simulation operation as defined in claim 11, wherein the route simulation controller further controls the following operations of:

presetting an overall route simulation time;

determining a total distance between the starting point and the destination; and allocating route simulation speeds to locations on the calculated route by reflecting the total distance and adjusting the first, second, and third route simulation speeds so that the route simulation operation will complete within the preset overall route simulation time.

16. An apparatus for conducting a route simulation operation as defined in claim 11, wherein said the route simulation controller further determines a type of road on the calculated route and adjusts the third route simulation speed depending on the type of road.

17. An apparatus for conducting a route simulation operation as defined in claim 11, wherein said the route simulation controller further determines maneuver points on the calculated route, categorizes the maneuver points based on complexity of maneuvering action, and decreases the route simulation speed depending on the category of the maneuver points, where the maneuvering action includes turn, U-turn, and stop.

18. An apparatus for conducting a route simulation operation as defined in claim 11, wherein the first route simulation speed for the first part of the calculated route is lower than the second route simulation speed for the second part of the calculated route.

19. An apparatus for conducting a route simulation operation as defined in claim 11, wherein the first route simulation speed for the first part of the calculated route or the second route simulation speed for the second part of the calculated route is further adjusted based on whether the first part or second part is congested or not.

20. An apparatus for conducting a route simulation operation as defined in claim 11, wherein said preset number of first turns from the starting point is three and said preset number of last turns before the destination is three.

* * * * *